Patented July 24, 1923.

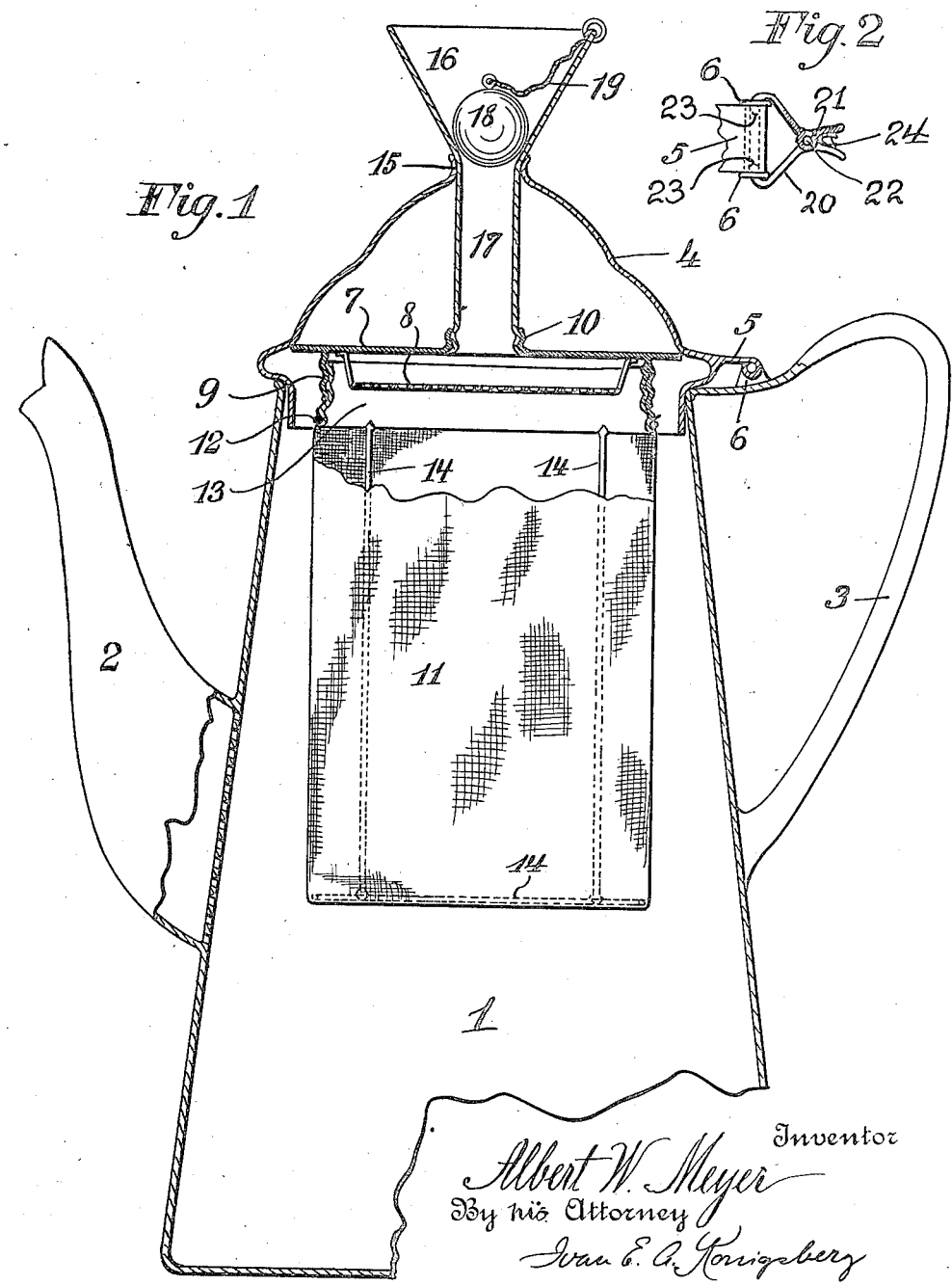

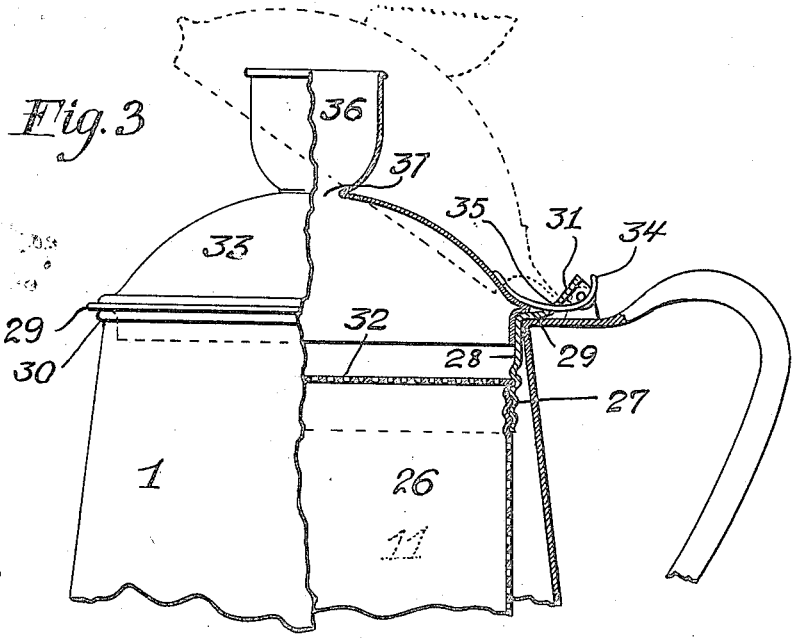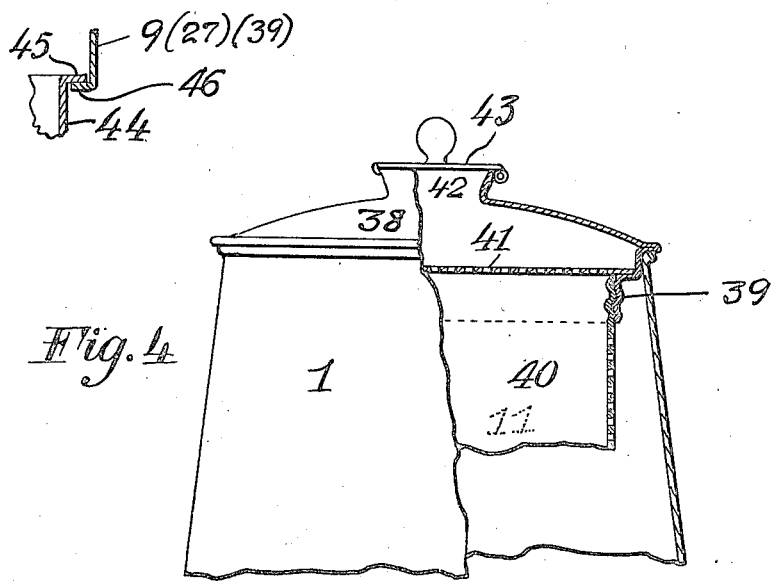

1,462,610

UNITED STATES PATENT OFFICE.

ALBERT W. MEYER, OF ROSELLE, NEW JERSEY.

COFFEE-MAKING APPARATUS.

Application filed May 27, 1922. Serial No. 564,068.

*To all whom it may concern:*

Be it known that I, ALBERT W. MEYER, a citizen of the United States, and resident of Roselle, in the county of Union and State of New Jersey, have invented certain new and useful Improvements in Coffee-Making Apparatus, of which the following is a specification.

The object of this invention is to provide a percolator attachment for coffee pots and similar vessels so arranged and constructed that coffee may be made practically instantaneously and in a cleanly and efficient manner.

One object of the invention is to provide a percolator attachment or construction peculiarly well adapted for use in connection with the ordinary plain coffee pots made of agate or enameled ware.

Another object of the invention is to provide an attachment so arranged that it fits the coffee pot closely so that it may remain thereon while the coffee pot is being carried about and the coffee poured.

Other objects will appear as this specification proceeds, while reference is had to the accompanying drawings illustrating the invention and in which—

Fig. 1 is a sectional view of a coffee pot provided with an attachment embodying the invention and with parts broken away.

Fig. 2 is a detail view of the hinge for the coffee pot cover.

Fig. 3 is a view partly in elevation and partly in section with parts broken away, of a modified arrangement of the percolator attachment.

Fig. 4 is a view similar to Figure 3 showing a different construction.

Fig. 5 is a detail view of parts shown in the preceding figures illustrating an alternative construction.

Throughout the drawings the reference numeral 1 denotes a coffee pot of the usual well known and commonly used kind generally made of white enameled ware or agate ware and having a spout 2 and handle 3. 4 is the usual cover shown in Figure 1 and hinged to the coffee pot by a hinge 5 coacting with hinge lugs 6, 6. See also Figure 2.

The percolator attachment shown in Figure 1 comprises a supporting plate 7 having depending therefrom in any suitable manner a perforated splasher plate 8 and a threaded flange 9. The plate 7 has a central threaded aperture 10. The percolator member may be in the form of a bag 11 which is removably secured as by a string 12 to a threaded ring 13, the bag fitting over a depending skeleton structure or bag distending member 14, 14.

The cover 4 of the coffee pot is provided with a central opening 15, which without the attachment is usually covered by a knob (not shown) and which is permanently removed as shown. Through the said opening 15 there is inserted a funnel 16 having a stem or pipe 17 threaded to engage the threaded aperture 10 aforesaid.

In mounting the attachment on the coffee pot, the hinge pin (not shown) is removed and the cover taken off. The supporting plate 7 is pushed up into the cover, while the funnel 16 is inserted from above and the two members screwed together at 10. Thereafter the percolator member 11 is screwed onto the flange 9.

These parts, therefore, become permanently, yet removably, secured to the cover 4. The funnel may be closed by a ball 18 secured by a chain 19.

Thereafter the cover 4 is placed on the coffee pot 1 with the parts in the position shown in Figure 1. For the sake of convenience in handling and shipping as well as pouring the coffee, the cover 4 may be secured to the pot by using the hinge clip shown in Figure 2, and which consists of two levers 20, 21 pivoted together at 22 and forming pintles 23, 23. A spring 24 is arranged to press the pintles inwardly in a well known manner. By pressing on the outer ends of the levers 20, 21 the pintles are moved apart sufficient to be inserted into the hinge lugs 6 and hinge 5. The reverse action removes the hinge clip and permits the cover to be taken off.

When it is desired to make coffee, the cover is taken off, the percolator member filled with ground coffee and thereafter screwed onto the ring or flange 13 and the cover replaced on the pot. Then the ball 18 is removed and boiling water poured over the coffee through the funnel 16. The water strikes the splasher plate 8 and flows down into the percolator member and percolates through the coffee therein. I have found that practically instantaneous coffee may be made in this manner, the making of the coffee being helped by this fact that the steam is kept within the pot because of the quick closure permitted by the use of the ball 18.

It will be seen that the parts are easily assembled as well as detached from the cover, and the construction is very inexpensive. Another feature is the fact that only the funnel 16 projects above the cover 4, thus eliminating danger of upsetting. Another advantage is that as all the parts are hung low within the pot, the coffee keeps hot for a longer time than would be the case where the construction contains elements raised above the cover.

Figure 3 illustrates a construction in which the cover and the percolator supporting member are separate from each other. The percolator member, which may be a bag member as in Figure 1 or a perforated metal cup member 26 as in Figure 3, is screwed into a threaded ring 27 depending from a flanged supporting member 28 having a flange 29 which rests upon the edge 30 of the coffee pot 1. The member 28 may be provided with a hinge 31 adapted to be secured to the hinge on the coffee pot by the hinge clip illustrated in Figure 2. A splasher 32 is suitably secured to the support 28. A cover 33 is provided which fits the support 28 and which may be hinged by means of a tail or hinge lug 34 adapted to be inserted through a slit 35 in the cover hinge 31. The cover 33 may have a funnel or cup 36 and the opening 37 may be closed with a ball as in Figure 1 or a cover (not shown) may be fitted over the cup 36 as will be understood.

With this construction, coffee is made by pouring boiling water in through the cup 36. The water strikes the splasher plate 32 and passes through the latter and into the percolator member 26 which contains the coffee. The support 28 and cover 33 are hinged as a matter of convenience and for better keeping the parts together.

The construction shown in Figure 4 differs from the one shown in Figure 3 in the fact the cover 38 is integral with the threaded flange 39 into which the percolator member 40 is screwed. The splasher 41 is suitably secured to the cover, which is provided with a pouring funnel 42 closed by a hinged cap 43.

Figure 5 illustrates an alternative construction in which the percolator member 44 (which in this figure represents both the bag member as in Figure 1 or the cup member as in Figures 3 and 4) is provided with a flange 45 adapted to rest upon an inturned flange 46 of the supporting member 9 (27 or 39).

It is obvious that changes may be made in the construction and configuration of the several parts of the devices disclosed herein without departing from the spirit of the invention as defined by the appended claims.

I claim:—

1. The combination with a coffee pot and its cover, of a percolator attachment therefor comprising a supporting plate within said cover, a percolator member detachably secured to said plate, a water inlet pipe extending downward within said cover to the said supporting plate, means for securing the latter to the said pipe, a funnel mounted on the upper end of the water inlet pipe and means for closing the inlet end of the same.

2. The combination with a coffee pot and its cover, of a percolator attachment therefor comprising a supporting member fitted within the said cover, a percolator member detachably secured to said member and depending therefrom a substantial distance within the said coffee pot, and a water inlet pipe within said cover and communicating with the said coffee pot and means for securing said water inlet pipe and said supporting member.

3. The combination with a coffee pot and its cover, of a percolator attachment therefor comprising a percolator member, means within the cover for suspending the percolator member therefrom a substantial distance downwardly within the said coffee pot, hinge lugs on said coffee pot and its cover and a removable hinge clip for engaging the said hinge lugs for the purpose set forth.

4. The combination with a coffee pot, of a percolator attachment therefor comprising a supporting member depending from the upper edge of the coffee pot and within the same, a percolator member detachably secured to said supporting member, a cover adapted to fit the latter and provided with an opening for admitting water, and means for securing the said cover and supporting member to the said coffee pot.

5. The combination with a coffee pot, of a percolator attachment therefor comprising a supporting member depending from the upper edge of the coffee pot and within the same, a percolator member detachably secured to said supporting member, a cover adapted to fit the latter and provided with an opening for admitting water, means for securing the said supporting member to the said coffee pot and means for hinging the said cover to the said supporting member.

6. The combination with a coffee pot, of a percolator attachment therefor comprising a cover adapted to rest upon the upper edge of said coffee pot and provided with an integral depending threaded flange within the said pot, a percolator member detachably secured to said flange, said cover being provided with an opening for admitting water, a cap for closing said opening and a splasher member secured to the said cover.

ALBERT W. MEYER.